June 16, 1931. E. H. KIELSMEIER 1,810,278
CLEAN EGG NEST
Filed Dec. 9, 1929 2 Sheets-Sheet 1
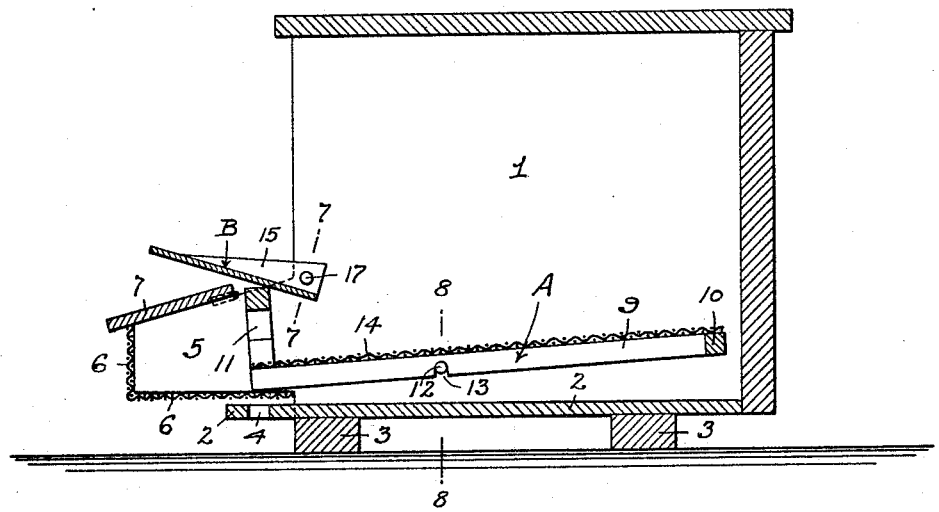
Fig. 1.
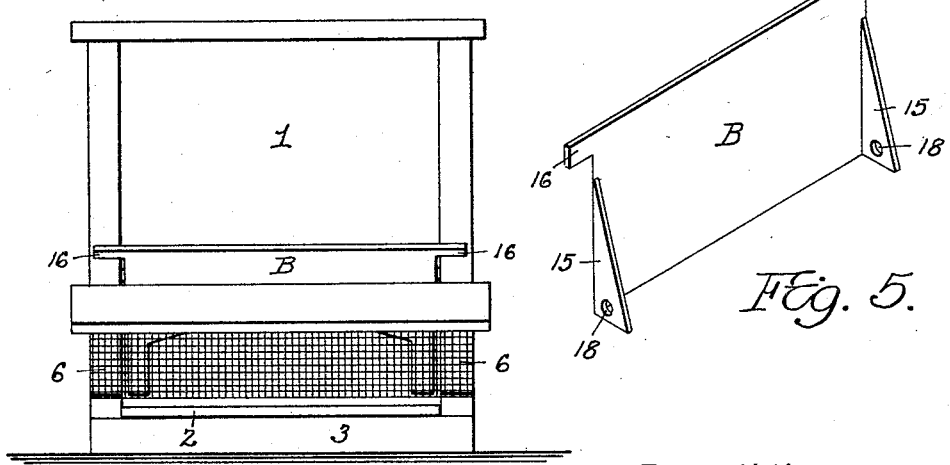
Fig. 2.
Fig. 5.
EDWIN H. KIELSMEIER
INVENTOR
BY Victor J. Evans
ATTORNEY
WITNESS: Lee Smith

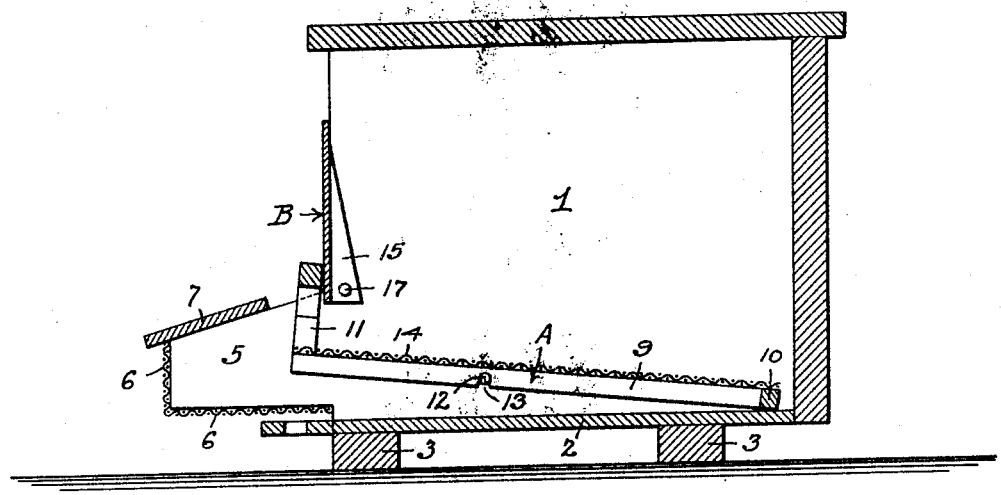
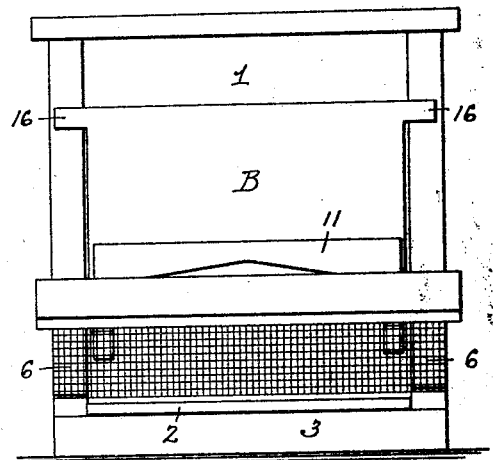
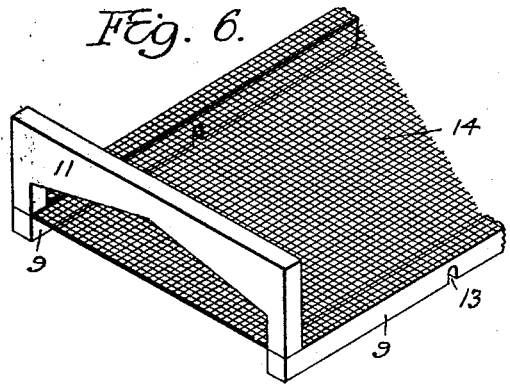
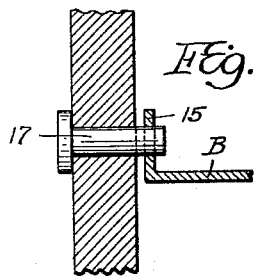
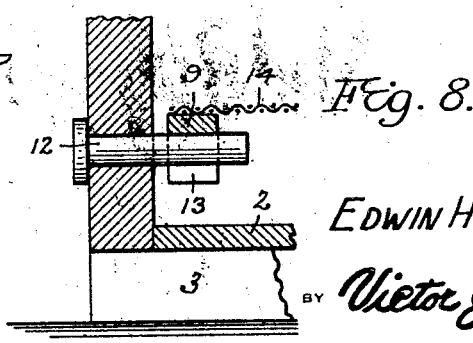

Patented June 16, 1931

1,810,278

UNITED STATES PATENT OFFICE

EDWIN H. KIELSMEIER, OF SUNNYSIDE, WASHINGTON

CLEAN EGG NEST

Application filed December 9, 1929. Serial No. 412,878.

This invention relates to a clean egg nest, the general object of the invention being to provide means for closing the nest when a hen enters the same so that another hen cannot enter the nest when the same is occupied, the parts moving to open position when the hen within the nest starts to leave the same, with means whereby the egg laid by the hen will be caused to enter an egg chamber as the hen leaves the nest.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a longitudinal sectional view through the nest, showing the same in open position.

Figure 2 is a front view of Figure 1.

Figure 3 is a view similar to Figure 1, but showing the parts in closed position.

Figure 4 is a front view of Figure 3.

Figure 5 is a perspective view of the door.

Figure 6 is a fragmentary perspective view of the pivoted platform.

Figure 7 is a section on line 7—7 of Figure 1.

Figure 8 is a section on line 8—8 of Figure 1.

In these views, the numeral 1 indicates the box-like body of the nest which has the major part of its front open and the bottom 2 is formed of a plate resting on the cross pieces 3 and having a hole 4 at its front end whereby the plate can be pulled from the body and cleaned and then replaced. An egg chamber 5 is arranged at the front lower part of the body and extends beyond the body and is formed of the wire mesh or hardware cloth 6 and the door 7, said door forming the top of the chamber and sloping downwardly and forwardly.

A platform A, composed of the side pieces 9, the end piece 10 and an arch-shaped front end piece 11, is tiltably supported in the lower part of the body by the pins 12 passing through the sides of the body into the notches 13 formed in the side pieces 9. These parts are so arranged that the platform will normally assume the position it occupies in Figure 1, with its front end resting against the bottom of the egg chamber 5. The platform is covered with hardware cloth 14.

A door B, composed of a metal plate having the inwardly extending flanges 15 at its ends and the projections 16 at its upper corners, is pivoted in the front part of the body by the pins 17 engaging the holes 18 formed in the flanges 15. This door will normally assume the open or tilted position shown in Figure 1, with a part of the door resting against the top of the arch 11.

Thus with the parts in the normal position, as shown in Figures 1 and 2, a hen can enter the nest and as she passes over the pivotal point of the platform, the rear end of the platform will drop under her weight and the front end will rise so that the arch 11 will move the door B to closed position, as shown in Figures 3 and 4. Thus another hen cannot enter the nest, though the door is of such width that a small opening will be left at the top of the front of the nest. After the hen has finished laying, she will naturally move toward this opening and as she passes beyond the pivotal point of the platform, the platform will drop to its original position shown in Figure 1, permitting the door also to drop, so that the hen can pass from the nest. As the platform assumes the position shown in Figure 1, the egg laid by the hen will roll down the same into the egg chamber 5, the egg passing under the arch, as will be understood. The nest is then ready to receive another hen and the eggs in the chamber 5 can be removed by opening the door 7.

Thus I have provided simple means for preventing a hen from entering a nest when the same is occupied by another hen and for depositing the eggs in an egg chamber so that they will not be broken or soiled by the hens occupying the nest.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A nest of the class described comprising a body open at its front, a tiltable platform in the lower part of the body having an upward extension at its front end, a pivoted door at the front of the body normally resting against the extension and raised when the platform is tilted by a hen entering the nest, an egg chamber at the front lower part of the body for receiving the eggs rolling down the platform when the same is in its normal position, a door forming the top of the egg chamber and a removable bottom for the body.

2. A nest of the class described comprising a body having its front open, a platform comprising a frame including an arch-shaped front part, wire mesh covering the platform, the side pieces of the frame having notches therein located forwardly of the center of the platform, pins passing through the sides of the body and engaging the notches whereby the platform is tiltably supported, a plate-like door having inwardly extending flanges at its ends, pins passing through the front of the sides of the body and through said flanges whereby the door is pivotally connected with the body and normally rests against the arch, said door being moved upwardly to closed position when the platform is tilted by a hen entering the same due to the arch moving the door upwardly and an egg chamber at the front lower part of the body for receiving the eggs rolling down the platform when the same moves to its normal position.

In testimony whereof I affix my signature.

EDWIN H. KIELSMEIER.